Figure 1:
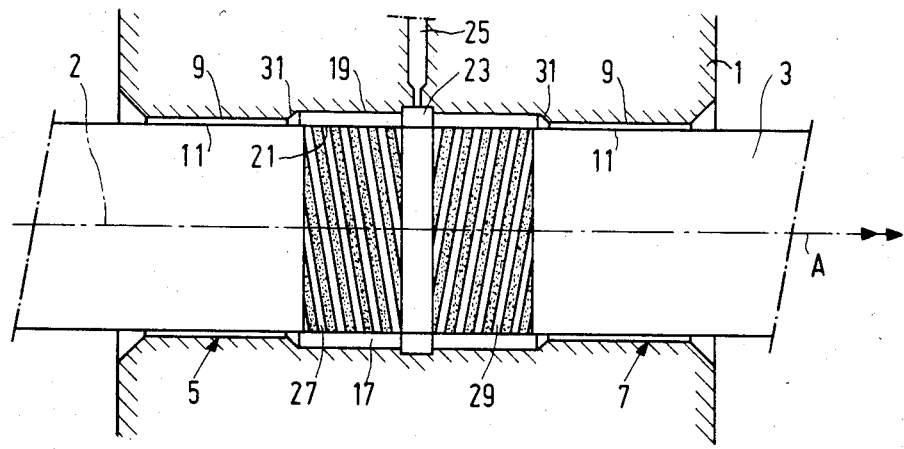

United States Patent [19]

Van Roemburg

[11] Patent Number: 4,596,474
[45] Date of Patent: Jun. 24, 1986

[54] BEARING SYSTEM COMPRISING TWO FACING HYDRODYNAMIC BEARINGS

[75] Inventor: Franciscus M. J. Van Roemburg, Dordrecht, Netherlands

[73] Assignee: U.S. Philips Corporation, New York, N.Y.

[21] Appl. No.: 743,256

[22] Filed: Jun. 11, 1985

[30] Foreign Application Priority Data

Jun. 13, 1984 [NL] Netherlands .................. 8401864

[51] Int. Cl.⁴ .................. F16C 32/06; F16C 33/10
[52] U.S. Cl. ............................ 384/114; 384/100; 384/115
[58] Field of Search ........... 384/99, 100, 114–120, 384/286, 287, 291–293, 322, 378, 414

[56] References Cited

U.S. PATENT DOCUMENTS

| | | | |
|---|---|---|---|
| 3,517,973 | 6/1970 | Hirs | 384/115 |
| 3,602,555 | 8/1969 | Hendler | 384/115 |
| 3,669,517 | 6/1972 | Hughes | 384/115 |
| 4,141,603 | 2/1979 | Remmers et al. | 384/108 |

FOREIGN PATENT DOCUMENTS

| | | | |
|---|---|---|---|
| 3325985 | 2/1984 | Fed. Rep. of Germany | |
| 37116 | 3/1982 | Japan | 384/100 |
| 30525 | 2/1983 | Japan | 384/100 |
| 8401006 | 3/1984 | World Int. Prop. O. | 384/100 |

*Primary Examiner*—Stuart S. Levy
*Assistant Examiner*—Thomas R. Hannon
*Attorney, Agent, or Firm*—David R. Treacy

[57] ABSTRACT

A bearing system comprises two hydrodynamic bearings 5 and 7 by means of which two bodies 1 and 3 are rotatably supported relative to one another. Each of the bearings 5 and 7 has an inner and an outer pattern of helical grooves, which patterns in the direction of rotation for which the bearing system is intended build-up in opposite direction a pressure in lubricant. A reservoir 17 is situated between the bearings 5 and 7 and has two patterns 27 and 29 of feed grooves which pump lubricant towards the bearings 5 and 7 during operation.

12 Claims, 2 Drawing Figures

BEARING SYSTEM COMPRISING TWO FACING HYDRODYNAMIC BEARINGS

The invention relates to a bearing system comprising two axially spaced hydrodynamic bearings by means of which two bodies, which comprise cooperating bearing surfaces, are supported for rotation about an axis of rotation relative to each other, at least one of the bearing surfaces of each of the bearings being formed with an inner pattern of helical grooves and an outer pattern of helical grooves which two patterns of grooves act in opposite directions to build-up a pressure in lubricant between the cooperating bearing surfaces during rotation of the bearing system in the direction for which it is intended, cylindrical wall portions of the bodies being situated between the two inner patterns.

Such a bearing system is disclosed in German Offenlegungsschrift DE No. 3325985. This known bearing system is employed in a motor unit, in which a rotatable hollow sleeve is journalled on a stationary shaft. The two radial hydrodynamic bearings are identical to each other and are symmetrical. For a correct operation there should always be an adequate amount of lubricant between the bearing surfaces. This construction is satisfactory if there is a regular external supply of lubricant to this known bearing system, but if no regular relubrication is effected and the system is filled only once with, for example, grease, the bearings will have lost their lubricant already after a short time, for example owing to leakage or evaporation, so that a correct operation is no longer possible.

It is the object of the invention to provide a bearing system of the type specified in the opening paragraph, which can be used for a long period of time without any relubrication being necessary.

To this end the bearing system according to the invention is characterized in that a lubricant reservoir is formed by a gap between the said cylindrical wall portions, which reservoir is provided with two patterns of helical feed grooves, which are formed at least in one of the wall portions and which during operation pump the lubricant towards the bearings.

During rotation of the bearing system in the direction for which it is intended, the lubricant in the bearings of the bearing system will be massed up by the inner and outer groove patterns which cooperate with each other as a fishbone pattern, so that the pressure build-up in the lubricant provides a satisfactory hydrodynamic lubrication. In order to sustain this hydrodynamic lubrication the bearings should always be provided with an adequate amount of lubricant, such as oil or grease. In the bearing system in accordance with the invention this is achieved by providing an additional amount of lubricant in the reservoir between the bearings, from which reservoir the lubricant is pumped towards the bearings during operation.

An advantage of the bearing system in accordance with the invention is that the reservoir with the pattern of feed grooves ensures that lubricant which is lost as a result of leakage or evaporation is replenished, so that the bearing system can operate without relubrication for a long period.

A preferred embodiment of the invention is characterized in that the outer patterns of grooves of the bearings build-up a pressure in lubricant which is higher than the pressure in lubricant built-up by the other patterns together.

Bearings in accordance with said embodiment are asymmetrical in order to minimize the loss of lubricant. This guarantees a very long life. An increased pressure in the outer patterns of grooves can be obtained by increasing the length of the grooves or by giving the grooves suitable depths, widths or pitch angles.

A preferred embodiment, which leads to an advantageous construction, is characterized in that the bodies have non-grooved wall portions situated between the inner patterns of the bearings and the patterns of the reservoir.

This embodiment has the advantage that the bearing system is less susceptible to the effect of tolerances in the axial direction, i.e. some axial displacement of the two bodies relative to each other is permissible without thereby adversely affecting the bearing operation. An additional advantage is that the less stringent tolerance requirements lead to lower production costs.

A further step is characterized in that one of the bodies has a lubricant-supply duct, which opens into the reservoir.

As a result of this step the lubricant need not be applied until the entire bearing system has been manufactured, which substantially simplifies the method of manufacturing the bearing system. Moreover, replenishing with lubricant is now simple.

Another embodiment is characterized in that in one of the wall portions the reservoir has a circumferential recess which surrounds the axis of rotation and which communicates directly with the supply duct.

An advantage of this embodiment is that the reservoir can be filled rapidly, because the lubricant which enters via the supply duct during filling is uniformly distributed without much resistance in the space between the two cylindrical wall portions. An additional advantage is the increased capacity of the reservoir.

Figure 2:
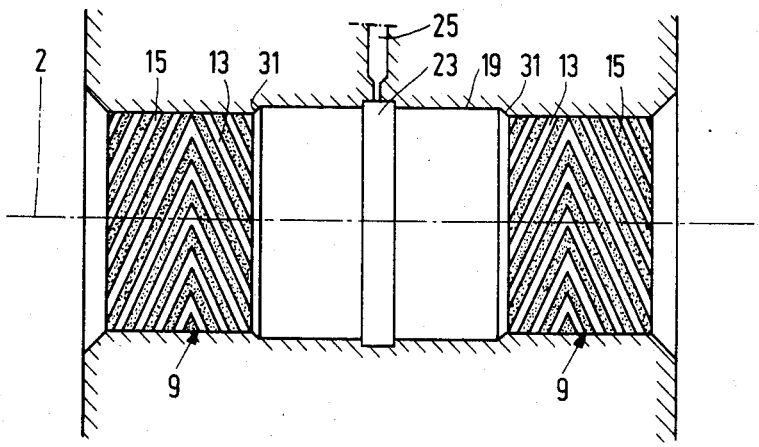

The invention will now be described in more detail, by way of example, with reference to the drawing, in which FIG. 1 is a schematic longitudinal sectional view, not to scale, of an embodiment of the bearing system in accordance with the invention, and FIG. 2 is a similar sectional view of the embodiment shown in FIG. 1, but in which one body is not shown.

The bearing system embodying the invention, shown in FIGS. 1 and 2, comprises a stationary body, which comprises a bearing housing 1, and a rotatable body, which comprises a horizontally disposed cylindrical shaft 3, which is rotatable about an axis of rotation 2. The bearing housing 1 is made of bronze and may form part of an electric motor, not shown, for example of a type as employed in audio and video equipment. The shaft 3 is made of steel and is journalled in the bearing housing 1 by means of two radial hydrodynamic bearings 5 and 7. Each of the bearings is provided with a lubricant, not shown, which may be a grease or oil.

The bearing housing 1 has two cylindrical bearing surfaces 9, which face two cylindrical bearing surfaces 11 of the shaft 3. In the bearing surfaces 9 of the bearing housing 1 two patterns 13 and 15 of shallow grooves are formed at the locations of the bearings 5 and 7, the grooves in the present example having a depth of 15 $\mu$m. In the bearings 5 and 7 the grooves of the inner pattern 13 are oriented oppositely to the grooves of the pattern 15, in such a way that as the shaft 3 rotates in the direction indicated by the arrow A each pair of patterns 13 and 15 forces lubricant in an opposite direction, so that a hydrodynamic pressure is built-up in the lubricant in the bearings 5 and 7.

The bearing system further comprises a lubricant reservoir 17, which is situated between the two bearings 5 and 7. The reservoir 17 is formed by a gap between a cylindrical wall portion 19 of the bearing housing 1 and a cylindrical wall portion 21 of the shaft 3. The height of the gap, i.e. the radial clearance between the wall portions 19 and 21, is for example a factor of 10 larger than the clearance between the wall portions 9 and 11 at the locations of the bearings 5 and 7 and is usually 50-100 μm. In order to increase the capacity of the reservoir 17 a circumferential recess 23 may be formed in the bearing housing, in which recess a feed duct 25 may open for filling the reservoir. Experiments have shown that when said radial clearance is 50-100 μm, the patterns 27 and 29 of feed grooves have an optimum effect if the depth of the feed grooves is between 100 and 300 μm.

The wall portion 21 of the shaft 3 is formed with two patterns 27 and 29 of feed grooves, which pump the lubricant towards the bearings 5 and 7 when the shaft 3 rotates in the said direction indicated by the arrow A.

The patterns 13 and 15 in the bearings 5 and 7 and the patterns 27 and 29 in the reservoir 17 are dimensioned in such a way relative to each other that the maximum pressure build-up by the outer pattern 15 is larger than the pressure build-up by the intermediate patterns 13, 27 and 29 together. This ensures that the lubricant is not pumped out of the bearing system.

If the bearing system in accordance with the invention is employed in a construction in which the shaft 3 is in an inclined or vertical position, it may be favourable to make the patterns 27 and 29 in the reservoir asymmetric in such a way that the pumping action in the upward direction is stronger than in the downward direction, so that the upper bearing can be constantly supplied with lubricant in a surprisingly simple manner.

In order to permit some axial clearance of the shaft 3 relative to the housing, the bearing system has a non-grooved wall portion 31 on opposite sides of the reservoir 17.

It is obvious that the scope of the invention is not limited to the present embodiment; for example all patterns of the bearing system may be formed in one of the bodies, or two bearings of different dimensions may be employed.

What is claimed is:

1. A bearing system comprising two axially spaced hydrodynamic bearings by means of which two bodies, which comprise cooperating bearing surfaces, are supported for rotation about an axis of rotation relative to each other, at least one of the bearing surfaces of each of the bearings being formed with an inner pattern of helical grooves and an outer pattern of helical grooves which two patterns of grooves act in opposite directions to build-up a pressure in lubricant between the cooperating bearing surfaces during rotation of the bearing system in the direction for which it is intended, cylindrical wall portions of the bodies being situated between the two inner patterns, characterized in that a lubricant reservoir is formed by a gap between the said cylindrical wall portions, which reservoir is provided with two patterns of helical feed grooves, which are formed at least in one of the wall portions and which during operation pump the lubricant towards the bearings.

2. A bearing system as claimed in claim 1, characterized in that the outer patterns of grooves of the bearings build-up a pressure in lubricant which is higher than the pressure in lubricant built-up by the other patterns together.

3. A bearing system as claimed in claim 2, characterized in that the bodies have non-grooved wall portions situated between the inner patterns of the bearings and the patterns of the reservoir.

4. A bearing system as claimed in claim 3, characterized in that one of the bodies has a lubricant-supply duct, which opens into the reservoir.

5. A bearing system as claimed in claim 4, characterized in that in one of the wall portions the reservoir has a circumferential recess which surrounds the axis of rotation and which communicates directly with the supply duct.

6. A bearing system as claimed in claim 2, characterized in that one of the bodies has a lubricant-supply duct, which opens into the reservoir.

7. A bearing system as claimed in claim 6, characterized in that in one of the wall portions the reservoir has a circumferential recess which surrounds the axis of rotation and which communicates directly with the supply duct.

8. A bearing system as claimed in claim 1, characterized in that the bodies have non-grooved wall portions situated between the inner patterns of the bearings and the patterns of the reservoir.

9. A bearing system as claimed in claim 8, characterized in that one of the bodies has a lubricant-supply duct, which opens into the reservoir.

10. A bearing system as claimed in claim 9, characterized in that in one of the wall portions the reservoir has a circumferential recess which surrounds the axis of rotation and which communicates directly with the supply duct.

11. A bearing system as claimed in claim 1, characterized in that one of the bodies has a lubricant-supply duct, which opens into the reservoir.

12. A bearing system as claimed in claim 11, characterized in that in one of the wall portions the reservoir has a circumferential recess which surrounds the axis of rotation and which communicates directly with the supply duct.

* * * * *